United States Patent [19]
Yoshida et al.

[11] Patent Number: 6,104,501
[45] Date of Patent: *Aug. 15, 2000

[54] IMAGE FORMING APPARATUS FOR CONCURRENT EXPOSURE OF LINES HAVING VARIABLE IMAGE DATA OUTPUT TIMING

[75] Inventors: Tatsuya Yoshida, Fukuoka-ken; Tadayuki Kajiwara, Chikushino, both of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/926,032

[22] Filed: Sep. 9, 1997

[30] Foreign Application Priority Data

Sep. 20, 1996 [JP] Japan .................................. 8-249502

[51] Int. Cl.[7] ....................................................... G06F 15/00
[52] U.S. Cl. ............................. 358/1.7; 358/481; 347/235
[58] Field of Search ................................... 395/107, 104, 395/106, 115, 101; 347/116, 117, 118, 235; 399/301; 101/481; 358/1.7, 1.4, 1.6, 1.16, 1.1, 481, 475, 494, 480, 296, 1.3, 1.5, 1.8, 1.9, 1.12, 1.13, 1.17, 1.18

[56] References Cited

U.S. PATENT DOCUMENTS 5,291,223  3/1994  Ogane et al. ............................ 347/116
5,381,167  1/1995  Fujii et al. ............................... 347/116

*Primary Examiner*—Dov Popovici
*Attorney, Agent, or Firm*—Stevens, Davis, Miller & Mosher, L.L.P.

[57] ABSTRACT

In an image forming apparatus, even when the image forming positions of the plural light beams of the exposure optical system vary, there can be formed an image without any shifting between image forming positions. In response to a print reference signal from a timing controller, an output controller causes a storage to output image data of a first raster to a second temporary memory and image data of a second raster to a first temporary memory. The output controller supplies the second and first temporary memories with data output reference signals respectively indicating points of timing when a predetermined period of time lapses after each of the laser beams respectively of first and second exposing units enters a sensor disposed at a reference position. According to the output reference signals, the image data is outputted to the first and second exposing units such that an image is formed at timing corresponding to image forming positions of the laser beams.

5 Claims, 7 Drawing Sheets

COLUMN ADDRESS

|  | (00) | (01) | (02) | (03) | (04) | (05) |
|---|---|---|---|---|---|---|
| ROW ADDRESS (00) | a | b | c | d | e | f |
|  | g | h | i | j | k | l |
| (01) | m | n | o | p | q | r |
|  | s | t | u | v | w | x |
| (02) |  |  |  |  |  |  |

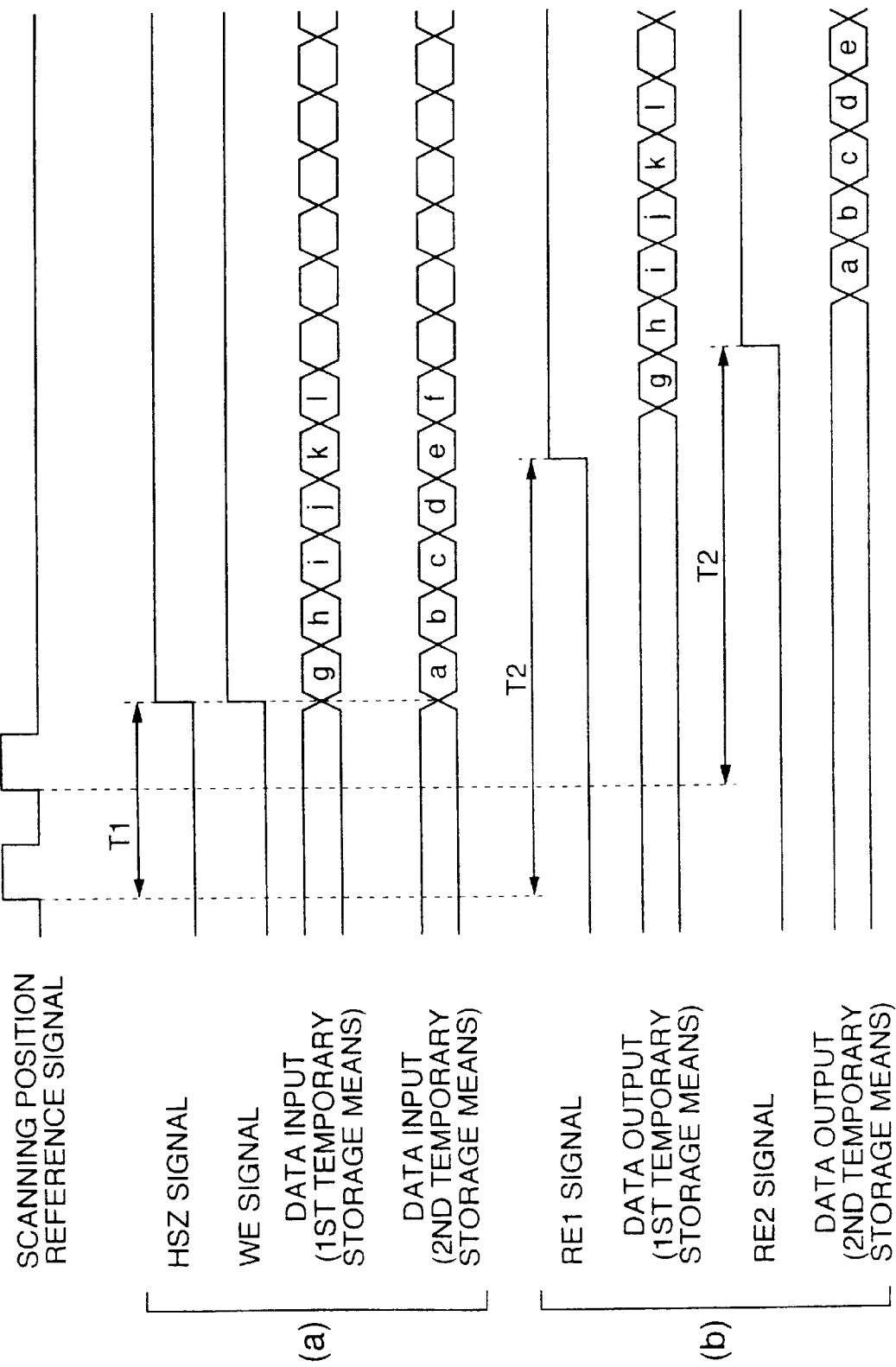

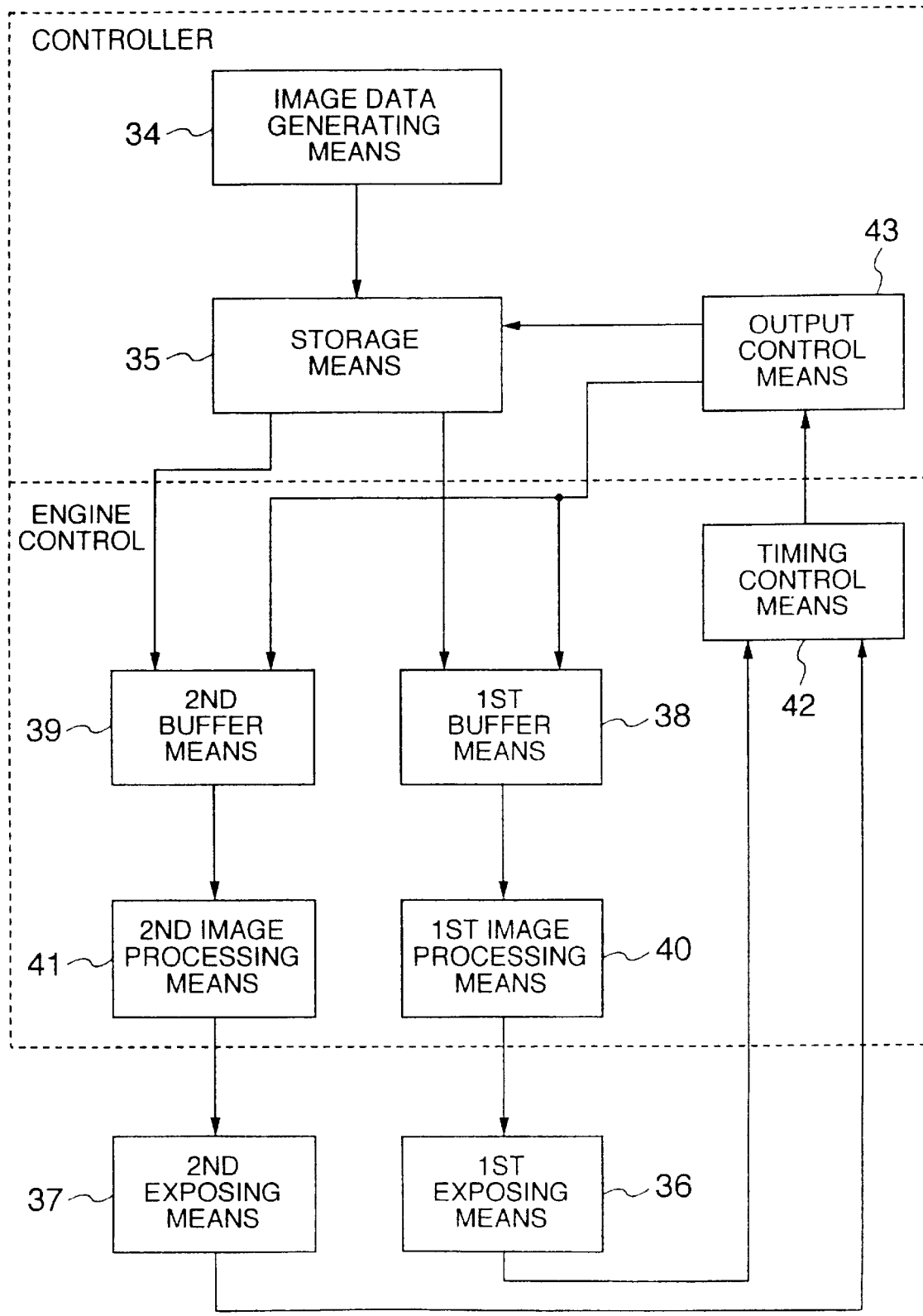

IMAGE FORMING APPARATUS FOR CONCURRENT EXPOSURE OF LINES HAVING VARIABLE IMAGE DATA OUTPUT TIMING

BACKGROUND OF THE INVENTION

1. Field of the Invention

The present invention relates to an image forming or producing apparatus for forming an image on a sheet of recording paper through an electrophotographic process.

2. Description of the Related Art

With recent increase in the processing speed of personal computers, workstations, and the like, it has been desired to increase the operation speed of image forming apparatuses using the electrophotographic process. FIG. 9 schematically shows a construction of a conventional image forming apparatus. It comprises process cartridge 4 enclosing photosensitive drum 1, electrifier 2 and developing portion 3, exposure optical system 5, transfer roller 6, deelectrifier 7, fixing portion 8, paper cassette 9, paper supply 10, paper exit tray 11 and drive motor 12. Electrifier 2 opposing the surface of photosensitive drum 1 comprises wire 13 formed of tungsten for example and mesh-structured grid plate 14 and electrifies the surface of drum 1 along the rotational direction (of arrow A) of the drum. Exposure optical system 5 forms an electrostatic latent image by optical modulation of image data and comprises constituents such as semiconductor lasers, lenses, and a polygon mirror for reflecting semiconductor laser beams.

In such an image forming apparatus configured as above, the character printing operation can be conducted at a higher speed by increasing the rotary speed of the polygonal mirror included in the exposure optical system of the apparatus.

However, the rotary speed of the mirror has already been nearly maximized in the prior art. Consequently, as an alternative countermeasure to achieve the high-speed operation, there has been employed a method in which a plurality of semiconductor easer units are disposed on a surface of a photosensitive drum to produce an electrostatic latent image so as to record a plurality of lines by the plural semiconductor lasers at the same time.

Next, description will be given of the configuration and operation of a conventional image forming apparatus including a plurality of semiconductor lasers. FIG. 5 is a diagram showing the configuration of an exposure optical system of an image forming apparatus including a plurality of semiconductor laser units, to which the present invention is applicable. In FIG. 5, the exposure optical system includes a first semiconductor laser 21 and a second semiconductor laser 22 arranged such that laser beam emitting directions thereof are orthogonal to each other. Additionally, the first and second lasers 21 and 22 are respectively connected to laser drivers 30 and 31. The drivers 30 and 31 modulate image data sent from an image processing section, not shown, and thereby respectively cause the lasers 21 and 22 to emit laser beams.

At a position in the laser beam emitting direction of the first laser 21, there is disposed a collimator lens 23 to collimate the laser beam. Similarly arranged at a position in the laser beam emitting direction of the second laser 22 is a collimator lens 24 for the same purpose. Furthermore, a beam splitter 25 is provided on the beam emitting side of the lenses 23 and 24. The beam splitter 25 orthogonally deflects the laser beam from the first laser 21 and allows the laser beam from the second laser 22 to pass therethrough and introduces the beams to a surface of a polygonal mirror 26. The mirror 26 is disposed about an axis of rotation of a polygonal mirror motor, not shown, rotating at a high speed to achieve a scanning operation by use of the laser beams from the lasers 21 and 22 in a direction toward the side of a photo-sensitive drum 1. Between the polygonal mirror 26 and the photosensitive drum 1, there are disposed an fθ lens 27 and a reflection mirror 28, the lens 27 decreasing the diameter of the laser beam reflected on the surface of the mirror 26 into a predetermined size. Moreover, arranged between the lens 27 and the mirror 28 is a sensor 29 to sense a reference position of the laser beam for the scanning operation.

In the image forming apparatus, using two laser beams radiated respectively from the first and second semiconductor lasers 21 and 22, it is possible to simultaneously record image data of two lines on the surface of the photosensitive drum 1 in a primary scanning direction B of the photosensitive drum 1.

FIG. 7 is a control block diagram of the conventional image forming apparatus including a plurality of semiconductor lasers. The configuration and operation of a control system of the image forming apparatus will be described by referring to FIG. 7.

In FIG. 7, image data generating means 34 generates image data (bit map data) according to image information from a host computer, not shown. Storage means 35 stores therein the image data generated by the image data generating means 34. First buffer means 38 and second buffer means 39 acquire from the storage means 35 image data items respectively related to first exposing means 36 and second exposing means 37, which will be described later, and then electrically amplify the data items to resultantly output amplified data items therefrom. First and second image processing means 40 and 41 conduct various kinds of image processing for the image data items respectively from the first and second buffer means 38 and 39 and output obtained data items respectively to the first and second exposing means 36 and 37. As shown in FIG. 5, the first and second exposing means 36 and 37 respectively include the first and second semiconductor lasers 21 and 22 to emit laser beams according to signals respectively from the first and second image processing means 40 and 41.

Timing control means 42 produces a print reference signal according to a scan position reference signal of the laser beam from each of the first and second exposing means 36 and 37. According to the print reference signal from the timing control means 42, output control means 43 controls the operation to sequentially output the image data from the storage means 35 to the first and second buffer means 38 and 39.

Next, operation of the image forming apparatus will be described.

In FIG. 7, the image data generating means 34 generates image data (bit map data) according to the image information from the host computer (not shown) and then stores the data in the storage means 35. In response to the print reference signal from the timing control means 42, the output control means 43 controls the storage means 35 to sequentially output the image data of raster 1 to the second buffer means 39 and the image data of raster 2 to the first buffer means 38.

While the image data of raster 1 is electrically amplified in the second buffer means 39 to be inputted to the second image processing means 41, the image data of raster 2 is electrically amplified in the first buffer means 38 to be inputted to the first image processing means 40. The first and second image processing means 40 and 41 correct variations in the printout quality due to fluctuation in the operational environments of the image forming apparatus and in the characteristics unique to the apparatus. For this purpose, the variations in the operation environment of the image forming apparatus and in the characteristics unique to the apparatus are sensed by various sensors, not shown, to correct the input image data according to the sensed data. The corrected image data items are then respectively delivered to the first and second exposing means 36 and 37.

Referring again to FIG. 5, the first and second exposing means 36 and 37 optically modulate the image data items by the first and second semiconductor lasers 21 and 22, respectively. The resultant laser beams are respectively converted through the collimator lenses 23 and 24 into parallel rays or beams. Thereafter, the laser beam from the first laser 21 is deflected 90° by the beam splitter 25 and the laser beam from the second laser 22 is passed through the beam splitter 25. The beams are reflected on a surface of the polygonal mirror 26 for the scanning operation at a predetermined angle in accordance with the rotary speed of the mirror 26.

Each of the laser beams which are sent from the first and second lasers 21 and 22 and which are reflected on the mirror 26 enters the lens 27 such that the diameter of the beam is reduced to a predetermined beam diameter and is then reflected on the reflection mirror 28 such that the beam scans the surface of the photosensitive drum 1 in a direction of arrow B.

The timing control means 42 receives a sense signal from the sensor 29 to generate a print reference signal. The print reference signal is acquired at a point of time when a predetermined period of time lapses after the sensor 29 detects the laser beam. The output control means 43 starts an operation to read image data from the storage means 35 in accordance with the print reference signal from the timing control means 42.

The photosensitive drum 1 rotates in a direction of arrow A at a fixed speed Vp (mm/sec). In consequence, when one scanning operation is completed in the direction of arrow B, the next scanning operation is initiated in the direction of arrow B at a position where the drum 1 has rotated a predetermined angle in the direction A.

FIG. 6 is a diagram showing an image forming operation in the conventional image forming apparatus, which shows a case correctly formed without unfavorable positional shifts or displacements of images formed on the drum. As can be seen from FIG. 6, a beam spot 33 of the second semiconductor laser 22 and a beam spot 32 of the first semiconductor laser 21 respectively conduct scanning operations for rasters 1 and 2 at the same time. Thereafter, the scanning operation is sequentially conducted for two rasters at a time, for example, rasters 3 and 4 such that image data is recorded as an electro-static latent image on the photosensitive drum 1 at a print speed which is twice the ordinary print speed.

However, in the exposure optical system of the conventional image forming apparatus, the image forming positions of the beam spots 32 and 33 on the surface of the drum 1 respectively of the lasers 21 and 22 may be different or shifted from each other in the primary scanning direction (arrow B).

FIG. 8 is an image forming diagram showing a case in which the image forming positions of the exposure optical system vary from each other in the conventional image forming apparatus. In this case, the output timing of image data from the storage means 35 is determined in response to the print reference signal from the timing control means 42 as described above. Namely, the same output timing applies to the image data items respectively of the first and second exposing means. Consequently, the image of rasters 2 and 4 printed by the first exposing means 36 is positionally shifted from that of rasters 1 and 3 printed by the second exposing means 37, which leads to a problem of considerable deterioration in the quality of the printed image.

To solve this problem, the image forming positions respectively of the beam spots 32 and 33 respectively of the first and second lasers 21 and 22 are adjusted to prevent the mismatching or shift between the printed images in the conventional technology. In accordance with the prior art, the image forming apparatus including a plurality of semiconductor lasers has been an expensive apparatus and hence there are produced a relatively small number of such image forming apparatuses. However, recently, the position adjustment is also conducted for image forming apparatuses which are broadly used and of which the production number is large. In consequence, the production method in which the exposure optical system is adjusted for each apparatus causes a considerable decrease in productivity and soaring production costs. Namely, such adjustments cannot be actually carried out in practical cases.

SUMMARY OF THE INVENTION

It is therefore an object of the present invention to provide an image forming apparatus in which even when the image forming position varies between a plurality of exposing means in the primary scanning direction, it is possible to form an image not including image portions formed or printed out of order.

To achieve the above object, there is provided an image forming apparatus according to the present invention which includes a plurality of exposing means for optically modulating image data and conducting a scanning operation on a recording media by use of modulated image data such that image data of a plurality of lines can be recorded through one scanning operation of the plural exposing means. The apparatus includes temporary storage means for temporarily storing image data therein, sensing means for sensing for each of the exposing means a point of timing when a scanning position of the exposing means reaches a reference position, timing control means for outputting a timing signal indicating a point of timing when a predetermined period of time lapses after the point of time of the sensing by the sensing means, and output control means for controlling, in response to the timing signal from the timing control means, the exposing means associated with the signal to output image data stored in the temporary storage means.

In the image forming apparatus according to the present invention, the timing control means detects a point of timing to scan the reference position for each exposing means so as to recognize a scan timing shift for each exposing means, i.e., a shift of the image forming position. The output control means achieves a control operation such that image data is outputted from the temporary storage means to each exposing means in response to the timing signal generated in consideration of the scan timing shift of the exposing means. Consequently, even when the image forming positions of beams respectively emitted from the plural exposing means differ from each other, the image data output timing is varied to prevent an occurance the event in which the image forming position varies between the exposing means. This makes it possible to form a high-quality image.

The image forming apparatus according to a first aspect of the present invention includes a plurality of exposing means for optically modulating image data and conducting a scanning operation on a recording medium by use of modulated image data such that image data of a plurality of lines can be recorded through one scanning operation of the plural exposing means. The apparatus includes temporary storage means for temporarily storing image data therein, sensing means for sensing for each of the exposing means a point of timing when a scanning position of the exposing means reaches a reference position, timing control means for outputting a timing signal indicating a point of timing when a predetermined period of time lapses after the point of time of the sensing by the sensing means, and output control means for controlling, in response to the timing signal from the timing control means, the exposing means associated with the signal to output image data stored in the temporary storage means.

Due to the provision above, even when the image forming positions of beams respectively emitted from a plurality of exposing means are shifted from each other, the output timing of image data is changed in accordance with the quantity of shift of the image forming position. This prevents the print forming positions from differing from each other and hence it is possible to form an image with a high quality.

There is provided an image forming apparatus according to a second aspect of the present invention in which a temporary storage means is disposed for each of the plural exposing means.

With this provision, the image data can be outputted from a plurality of temporary storage means to the associated exposing means at points of timing generated in consideration of the amount of shift of the image forming position of the beam from the related exposing means. This makes it possible to form a high-quality image free of an image portion in which the image forming positions differ from each other.

BRIEF DESCRIPTION OF THE DRAWINGS

The objects and features of the present invention will become more apparent from the consideration of the following detailed description taken in conjunction with the accompanying drawings in which:

FIG. 3 is a signal timing chart showing control operation of the embodiment of the image forming apparatus according to the present invention;

FIG. 7 is a control block diagram of a conventional image forming apparatus including two semiconductor lasers;

DESCRIPTION OF THE PREFERRED EMBODIMENTS

Figure 1:
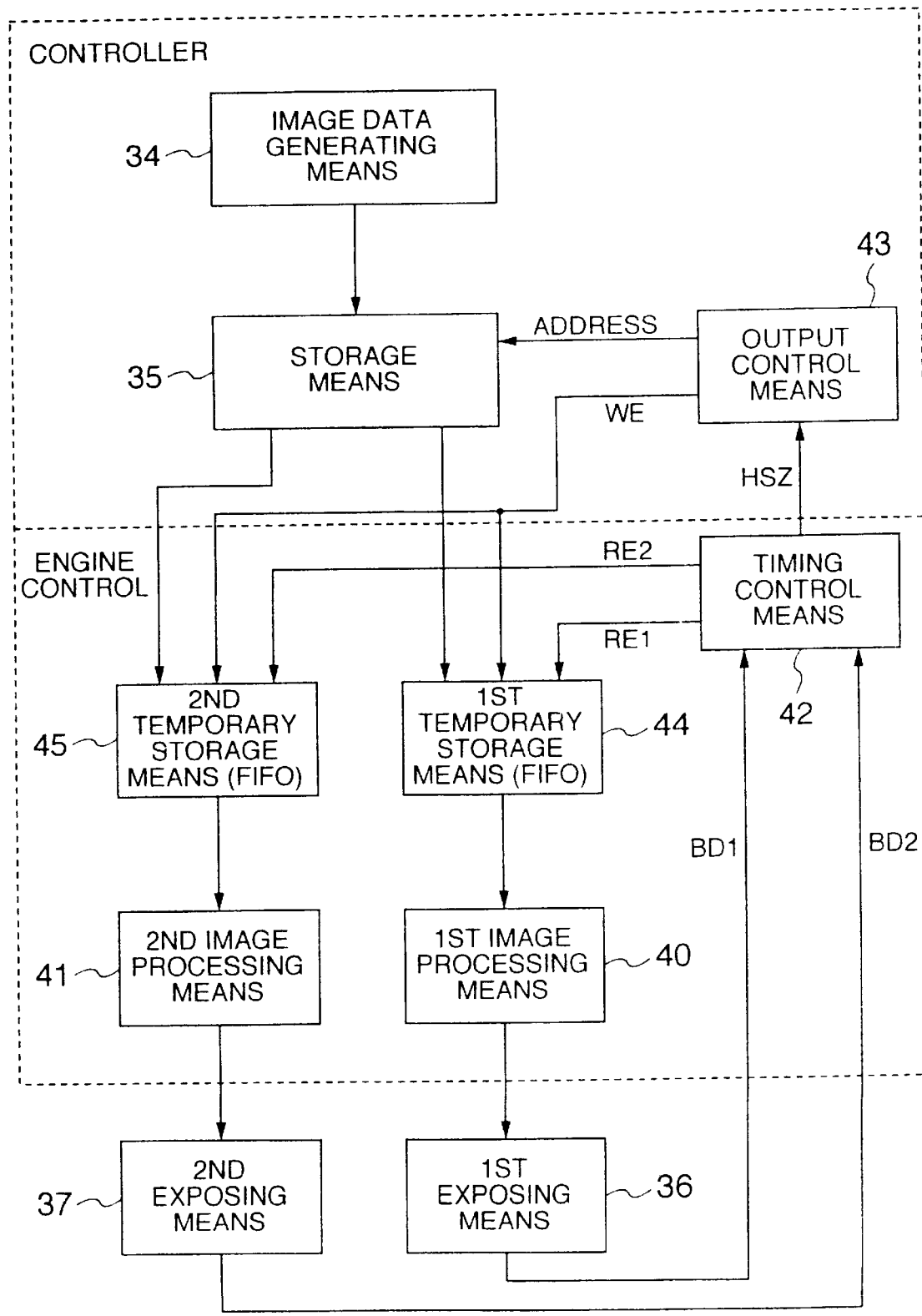
FIG. 1 is a control block diagram of an embodiment of an image forming apparatus in accordance with the present invention.

Referring now to the drawings, description will be given of an embodiment of the image forming apparatus according to the present invention.

FIG. 1 is a control block diagram of an embodiment of the image forming apparatus according to the present invention. The difference between the image forming apparatus of the present invention and the conventional image forming apparatus resides in that the point of output timing of image data varies between the first and second exposing means. Therefore, the configuration of the exposure optical system of the apparatus will be appreciated by referring to FIG. 5, namely, the configuration will not be again described in detail. Furthermore, in the configuration of FIG. 1, the same constituent components as those of the control blocks of the conventional apparatus shown in FIG. 7 will be respectively assigned with the same reference numerals.

In FIG. 1, image data generating means 34 generates image data (bit map data) according to image information from a host computer, now shown. Storage means 35 stores therein the image data generated by the image data generating means 34.

First and second temporary storage means 44 and temporarily store image data items which are outputted from the storage means 35 and which are respectively related to first and second exposing means 36 and 37. Moreover, the first and second temporary storage means 44 output the image data items to first and second image processing means 40 and 41 in response to a data output reference signal outputted from timing control means 42.

The first and second image processing means 40 and 41 accomplish various image processing for image data items respectively outputted from first and second temporary storage means 44 and 45 to output resultant data items respectively to first and second exposing means 36 and 37. The exposing means 36 and 37 respectively include first and second semiconductor lasers 21 and 22 to respectively emit laser beams onto a surface of a photosensitive drum 1 so as to form an electrostatic latent image on the surface.

Timing control means 42 outputs a print reference signal HSZ to output control means 43, and outputs a data output reference signal RE1, RE2 to storage means 44, 45, respectively in response to a scanning position reference signal of each laser beam. The output control means 43 controls an operation to read image data from the storage means 35 according to the print reference signal from the timing control means 42.

Description will now be given of the image data output operation in the image forming apparatus configured as above.

Figures 2, 4:
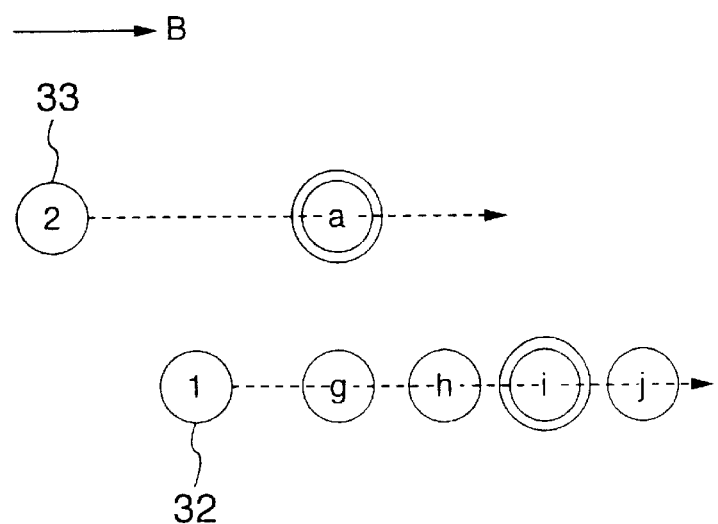
FIG. 2 is a diagram explanatorily and schematically showing an array of image data stored in storage means of the image forming apparatus.
FIG. 4 is a diagram showing a positional shift of an image forming beam spot in the apparatus.

In FIG. 1, the image data generating means 34 generates image data (bit map data) according to image information from a host computer, not shown, to store the data in the storage means 35. FIG. 2 is a diagram illustratively showing an array of the image data stored in the storage means 35 of the image forming apparatus. FIG. 3 is a control timing chart of the embodiment and FIG. 4 is an image forming diagram of the embodiment.

As shown in FIG. 2, the image data is stored in the storage means 35 such that image data (a,g) of first dots of rasters 1 and 2 are stored at address 0000, image data (b,h) of second dots of rasters 1 and 2 are stored at address 0001, and so forth.

Figure 5:
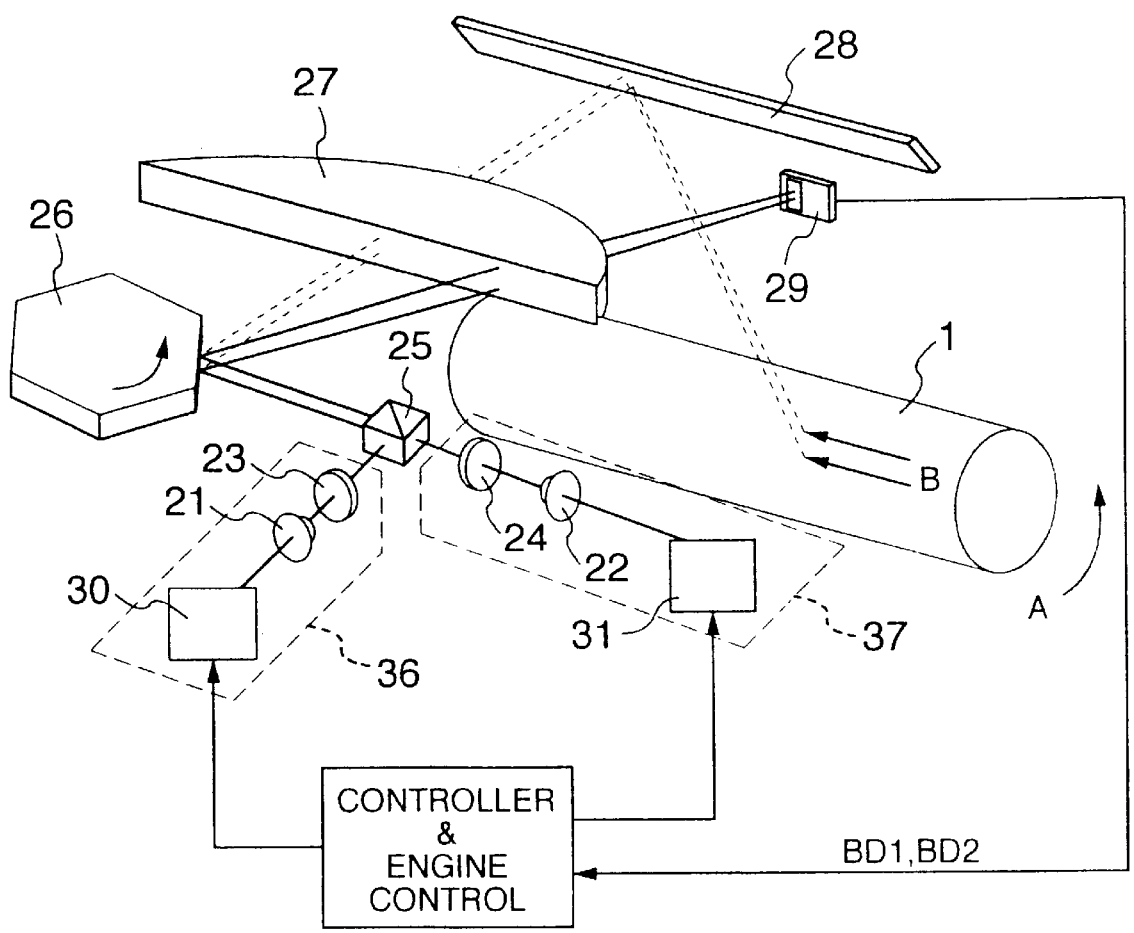
FIG. 5 is a diagram showing the configuration of an exposure optical system of the image forming apparatus including a plurality of semiconductor lasers.
Figure 6:
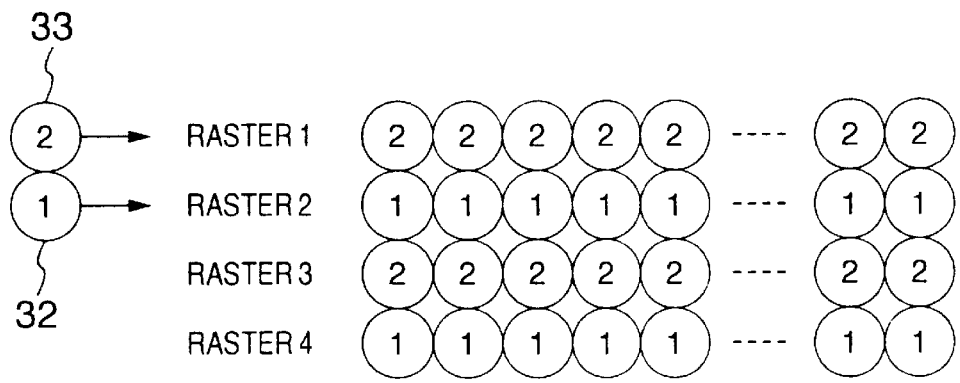
FIG. 6 is a diagram showing an image forming operation of the image forming apparatus.
Figure 8:
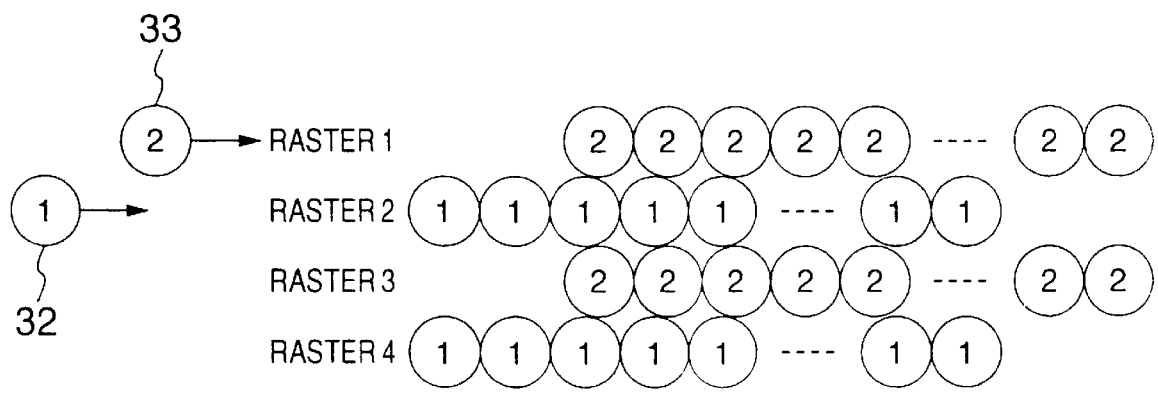
FIG. 8 is a diagram showing an image formed in the conventional image forming apparatus in which image forming positions are shifted from each other in the exposure optical system.
Figure 9:
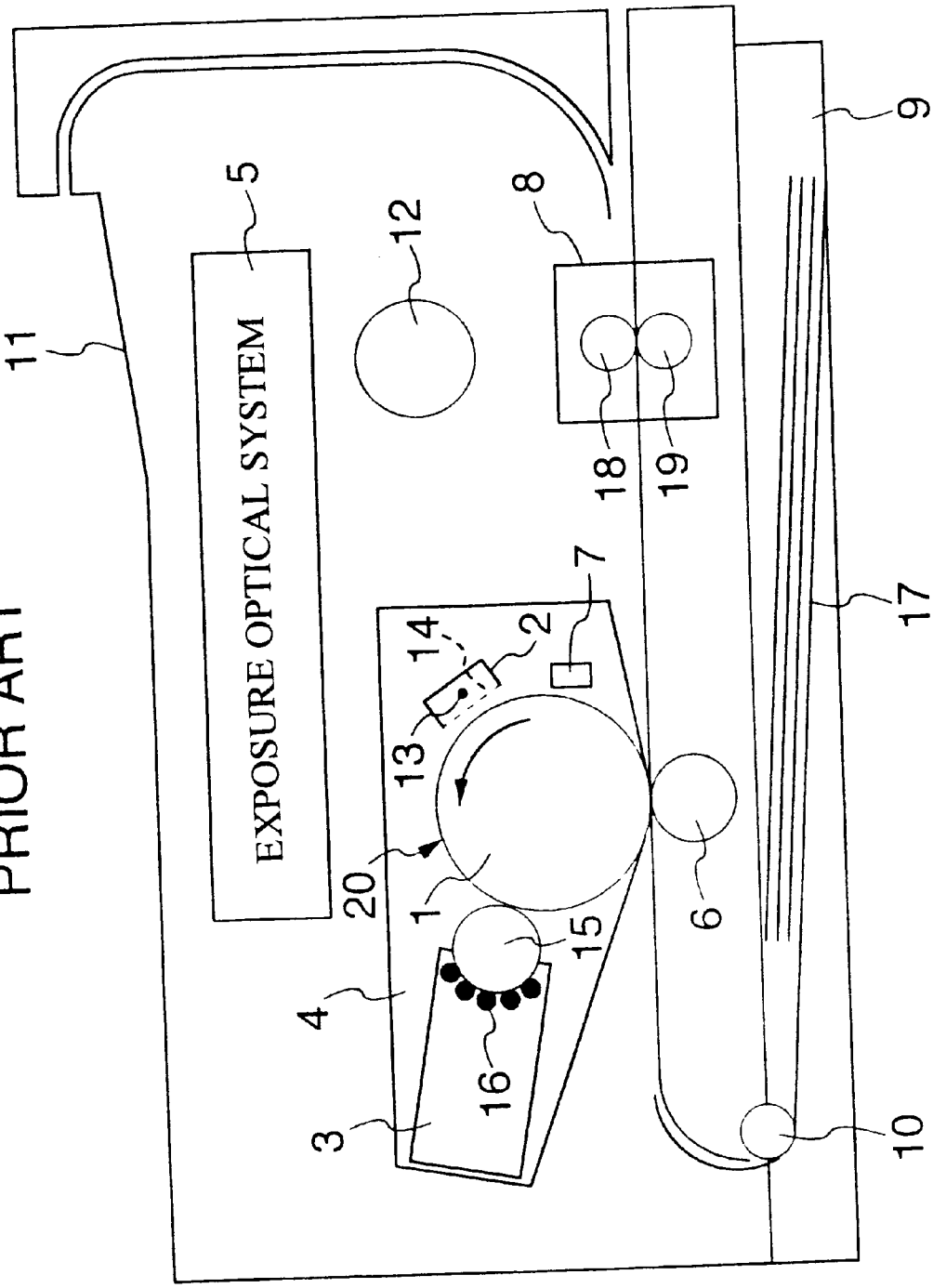
FIG. 9 schematically shows a constitution of a conventional image forming apparatus.

Referring now to FIGS. 1 and 5, when the laser beams respectively emitted from the first and second semiconductor lasers 21 and 22 pass the sensor 29, scanning position reference signals BD1, BD2 are respectively generated from the sensor 29 to the timing control means 42 (a BD signal stands for a Beam Detect signal).

In the situation shown in FIG. 4, an image forming position of the beam spot 32 (numbered as "1") from the first laser 21 is shifted from that of the beam spot 33 (numbered as "2") from the second laser 22 in a direction of arrow B.

In this case, the image forming position of the beam spot 32 from the first laser 21 is shifted two pixels in the direction of arrow B from that of the beam spot 33 from the second laser 22. Namely, it is necessary to control output operations of the first and second temporary storage means 44 and 45 by the timing control means so that the respective data items of the storage means 44 and 45 are collaterally or concurrently outputted to be in a combination of (a,i), (b,j), (c,k), etc. (i.e., outputting data "a" and "i" at the same timing, for example). With such an output data combination from the storage means 44 and 45, the first and second exposing means 36 and 37 form images of the correct image positions as a result of the positional shift of the formed images.

Namely, the combination of image data stored in the storage means 35 as above is in the order of (a,g), (b,h), and so forth. For the image data (a,b,c,d, . . . ) to be obtained from the beam spot 32 of the first semiconductor laser 21 at an advanced position, the points of output timing from the first and second temporary storage means 44 and 45 constructed for the first-in-first-out (FIFO) structure are controlled by the timing control means 42 to thereby remove the problem of shift between image forming positions.

In FIG. 3, on receiving the BD1 signal, the timing control means 42 sends a print reference (HSZ) signal to the output control means 43 when a predetermined period of time T1 lapses after a reference point of BD1 signal (an HS signal represents a Horizontal Size signal and is at a high level in the printing zone of each raster).

In FIG. 1, the output control means 43 carries out the output operation to the storage means 35 including a dynamic random access memory (DRAM) by incrementing the address of the storage means 35 at a cycle or period of a write clock signal, not shown, beginning at a point of time when the HSZ signal becomes active ("1" in this case). The storage means 35 outputs image data stored at the specified address thereof to the first and second temporary storage means 44 and 45. At the same time, the output control means 43 outputs a write enable (WE) signal allowing a data write operation to the storage means 44 and 45 as shown in FIG. 3.

As shown in (a) of FIG. 3, the output control means 43 outputs address signals to the storage means 35 to output image data of raster 1 to the second temporary storage means 45 and image data of raster 2 to the first temporary storage means 44. Simultaneously, the output control means 43 sends a WE signal to the storage means 44 and 45.

The first and second temporary storage means 44 and 45 are configured in the FIFO structure in which when the WE signal from the output control means 43 is active, the means 44 and 45 temporarily and sequentially store image data outputted from the storage means 35 in synchronism with the write clock, not shown, in the data input sequence. The FIFO operation has already been commonly known and hence will not be described in detail.

As shown in (b) of FIG. 3, the timing control means 42 outputs a data output reference signal or a read enable (RE1) signal to the first temporary storage means 44 when a predetermined period of time T2 lapses after a reference point denoted by the scanning position reference signal BD1 supplied from the sensor 29 for the first exposing means 36. Furthermore, the output control means 43 outputs the data output reference (RE2) signal to the second temporary storage means 45 when the predetermined period of time T2 lapses after a reference point denoted by the scanning position reference signal BD2 from the sensor 29 for the second exposing means 37. When the RE1 and RE2 signals are active, the storage means 44 and 45 respectively output the image respectively to the first and second image processing means 40 and 41 in the data input order at timing synchronized with a read clock signal, not shown. In consequence, the point of output timing of image data for the first exposing means 36 is shifted from that of output timing of image data for the second exposing means 36 by the difference of time between the scanning position reference signals BD1 and BD2 from the sensor 29.

In the first and second image processing means 40 and 41, to correct fluctuation in the quality of printed image due to variations in the operational environments and characteristics of the apparatus, the image data inputted from the first and second temporary storage means 44 and 45 is corrected in consideration of the deviations in the environments and characteristics recognized by various sensors, not shown, and is then outputted to the first and second exposing means 36 and 37. The means 36 and 37 then form an image on a surface of the photosensitive drum 1 according to the image data from the first and second image processing means 40 and 41.

FIG. 4 shows the operation of forming an image. Referring now to FIGS. 3 and 4, as can be understood from the scanning position reference signals BD1 and BD2, the position of image formation for the laser beam (beam spot 32) of the first exposing means 36 is shifted from that for the laser beam (beam spot 33) of the second exposing means 37 in the direction of arrow B. Therefore, the image data outputted in response to the reference signal RE1 is used to form respective images sequentially beginning at the first pixel "g", as shown in (b) of FIG. 3. In this situation, the reference signal RE2 for the second exposing means 37 is not in the active state. Consequently, the second exposing means 37 does not accomplish the image forming operation.

When time lapses and the RE2 signal is set to the active state, the second exposing means 37 initiates the image formation. In the example of FIG. 4, due to the positional shift of the image forming position of the first laser beam spot 32, which is shifted by two pixels in the direction of arrow B from that of the beam spot 33, the first pixel image "g" is formed with the positional shift of two pixels in the direction on the drum. The first pixel image "a" of raster 1 is formed at a position aligned with the first pixel image "g" of raster 2. At this point of time, the first exposing means 36 is forming an image of the third pixel "i".

Even when the imaging position varies between the laser beams of the first and second exposing means 36 and 37 as above, the timing of image formation by the first and second exposing means 36 and 37 is altered through the FIFO adjusting operation in accordance with the amount of shift.

For the image forming apparatus, the section generally called "controller section" including the image data generating means 34, storage means 35, and output control means 43 and the section called "engine control section" including the timing control means 42, first and second temporary storage means 44 and 45, and first and second image processing means 40 and 41 are separately developed in many cases. In this regard, according to the image forming apparatus of the present invention, the shift between the image forming positions of the plural exposing means is not required to be taken into consideration when developing the controller section. Resultantly, the engine control section can be constructed in a more generalized configuration.

As above, in accordance with the present invention, even when there occurs a shift between the image forming positions of a plurality of exposing means, it is possible to form a highly precise image not including any portion in which the image forming positions differ from each other while adjustment and complex processing become unnecessary in the assembly of the exposure optical system.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image forming apparatus comprising:

exposing means for generating a plurality of light beams for impinging upon and reflecting from a single polygonal rotatable mirror having a plurality of mirror surfaces and for concurrent scanning of different ones of a plurality of lines on a recording medium;

temporary storage means for temporarily storing image data for said plurality of lines;

sensing means for sensing first points of timing when each of the light beams scanning said different ones of said plurality of lines respectively reaches a predetermined position;

timing control means for outputting timing signals indicating second points of timing when a predetermined period of time elapses after the first points of timing sensed by the sensing means; and output control means for enabling outputting of image data stored in the temporary storage means corresponding to ones of said plurality of light beams generated by said exposing means, in response to said timing signals from said timing control means.

2. An image forming apparatus according to claim 1, wherein said temporary storage means comprises a plurality of separate temporary storage units associated with the plurality of light beams generated by said exposing means.

3. An image forming apparatus according to claim 1, wherein the temporary storage means is configured in a FIFO structure.

4. An image forming apparatus according to claim 2, wherein the temporary storage means is configured in a FIFO structure.

5. An image forming apparatus according to claim 1, wherein said plurality of light beams are two in number and said plurality of lines are also two in number.

* * * * *